US011949088B2

(12) United States Patent
Minami et al.

(10) Patent No.: US 11,949,088 B2
(45) Date of Patent: Apr. 2, 2024

(54) ELECTRODE TREATMENT METHOD

(71) Applicant: Panasonic Intellectual Property Management Co., Ltd., Osaka (JP)

(72) Inventors: Hiroshi Minami, Osaka (JP); Shigeru Hanaoka, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/973,533

(22) PCT Filed: Feb. 21, 2019

(86) PCT No.: PCT/JP2019/006618
§ 371 (c)(1),
(2) Date: Dec. 9, 2020

(87) PCT Pub. No.: WO2020/003602
PCT Pub. Date: Jan. 2, 2020

(65) Prior Publication Data
US 2021/0257605 A1    Aug. 19, 2021

(30) Foreign Application Priority Data
Jun. 25, 2018 (JP) ................................ 2018-119832

(51) Int. Cl.
H01M 4/04 (2006.01)
H01M 10/54 (2006.01)

(52) U.S. Cl.
CPC ......... H01M 4/0435 (2013.01); H01M 10/54 (2013.01)

(58) Field of Classification Search
CPC ....... H01M 6/52; H01M 10/54; H01M 4/0435
See application file for complete search history.

(56) References Cited

U.S. PATENT DOCUMENTS

2009/0140084 A1* 6/2009 Horigane ............... B02C 7/184
241/257.1
2016/0372802 A1* 12/2016 Chiang .................. H01M 6/52

FOREIGN PATENT DOCUMENTS

CN    107824299 A  *  3/2018
EP       948076 A1     10/1999
(Continued)

OTHER PUBLICATIONS

Machine translation of CN 107824299 A (Year: 2018).*
(Continued)

Primary Examiner — Matthew T Martin
Assistant Examiner — Unique Jenevieve Luna
(74) Attorney, Agent, or Firm — WHDA, LLP

(57) ABSTRACT

Provided is an electrode treat rent method comprising a peeling step that involves grind ng, with a grinding means, an electrode in which an electrode mixture is held on a collector, and peeling the electrode mixture from the collector, the electrode treatment method Characterized in that the grinding means has a first member (3) that has a grinding surface and a second member (4) that has a grinding surface, and the first member (3) and the second member (4) are disposed so that the grinding surfaces of the first member (3) and the second member (4) face each other and a space for grinding the electrode is formed between the members, and at least one among the first member (3) and the second member (4) is a grinder that rotates around the direction in which the grinding surfaces face each other and which serves as the rotational axial direction.

8 Claims, 2 Drawing Sheets

(56) References Cited

FOREIGN PATENT DOCUMENTS

| EP | 2975686 A1 | * | 1/2016 | ............. C22B 7/005 |
|----|------------|---|--------|--------------------------|
| JP | H06-306788 A | | 11/1994 | |
| JP | H09-163958 A | | 6/1997 | |
| JP | H10-214623 A | | 8/1998 | |
| JP | H11-199281 A | | 7/1999 | |
| JP | 3634927 B2 | | 3/2005 | |
| JP | 2008-156207 A | | 7/2008 | |
| JP | 2012-206941 A | | 10/2012 | |
| JP | 6238070 B2 | | 11/2017 | |

OTHER PUBLICATIONS

Translation of International Search Report dated May 21, 2019, issued in counterpart Application No. PCT/JP2019/006618. (2 pages).

* cited by examiner

ELECTRODE TREATMENT METHOD

TECHNICAL FIELD

The present disclosure relates to technique for an electrode treatment method.

BACKGROUND ART

Electrodes used in batteries such as lithium-ion batteries contain electrode composites containing current collectors such as aluminum and copper, and active materials, such as cobalt, nickel, manganese, lithium, or other compounds or graphite or other carbon materials applied on the current collectors. It is preferable, in terms of effective resource utilization, to isolate and recover current collectors and the electrode composites from, for example, electrode waste materials produced in electrode manufacturing processes or electrodes incorporated in used batteries.

For instance, Patent Literature 1 discloses an electrode treatment method including, the step of crushing, with a crusher, an electrode of a lithium ion secondary battery in which an electrode composite containing an active material is held on a current collector, the step of separating the electrode composite from the current collector, and the step of dividing the crushed material obtained by crushing the electrode into a crushed material mainly composed of the current collector and a crushed material mainly composed of the electrode composite.

In addition, for instance, Patent Literature 2 discloses an electrode treatment method including: roughly crushing a mixture of a positive electrode and a negative electrode of a used lithium ion battery to obtain a coarse crushed mixture containing the active materials in the positive electrode and the negative electrode and the coarse crushed material in the current collector; removing resins and magnetic deposits from the coarse crushed mixture and then secondary crushing the coarse crushed mixture; and sieving the secondary crushed material into fine particles having a particle size a less than 0.5 mm mainly composed of an active material, medium-sized particles having a particle size of 0.5 mm or more and 5 mm or less, and coarse particles having a particle size of more than 5 mm containing combustible materials, thereby recovering the active materials from the fine particles.

CITATION LIST

Patent Literature

PATENT LITERATURE 1: Japanese Patent No.3634927
PATENT LITERATURE 2: Japanese Patent No.6238070

SUMMARY

When an electrode is crushed with a conventional crusher, a strong shearing force is likely to be applied in the thickness direction of the electrode, so that both the electrode composite and the current collector are finely crushed and pulverized. For this reason, even if an attempt is made to divide the crushed material obtained by crushing the electrode into the electrode composite and the current collector, the current collector may be mixed in the electrode composite, making it difficult to isolate the electrode composite and the current collector from each other efficiently.

It is therefore an advantage of the present disclosure to provide an electrode treatment method that enables efficient isolation of an electrode composite and a current collector.

One aspect of the present disclosure is an electrode treatment method comprising: a separation step of grinding, with grinder means, an electrode in which an electrode composite is held on a current collector and separating the electrode composite from the current collector, wherein the grinder means include a grinder that includes a first member having a grinding surface and a second member having a grinding surface, and the first member and the second member are positioned so that the grinding surfaces of the first member and the second member face each other and a space for grinding the electrode is defined between the grinding surfaces, and at least one of the first member and the second member rotates about a rotation axis extending in a direction in which the winding surfaces face each other.

According to one aspect of the present disclosure, an electrode treatment method can be provided that enables efficient isolation of an electrode composite and a current collector.

DESCRIPTION OF EMBODIMENTS

Figure 1:
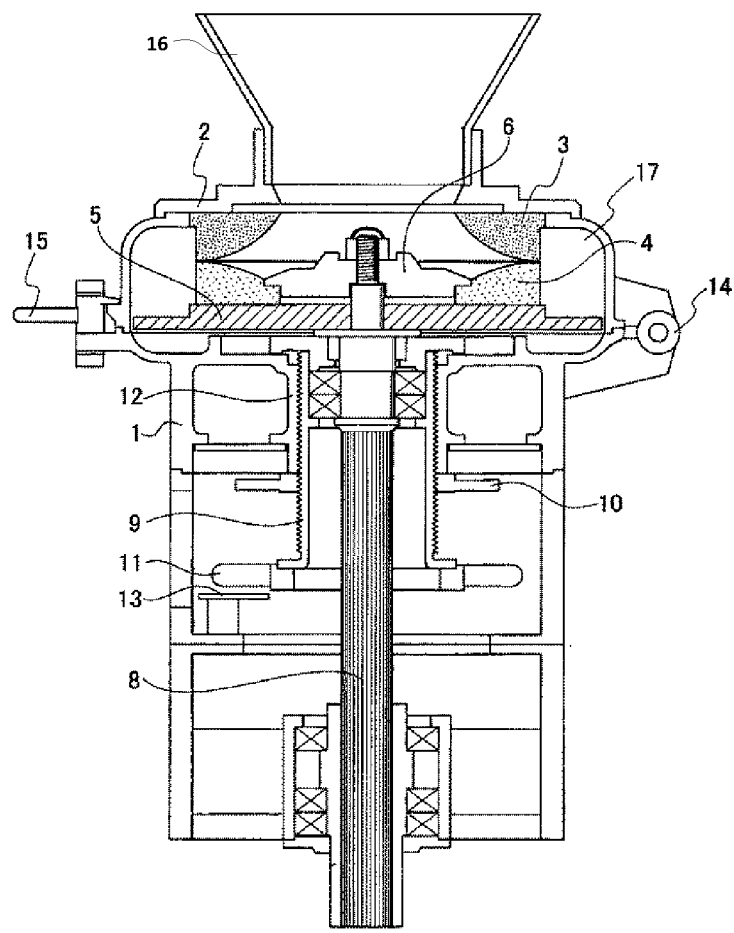
FIG. 1 is a schematic cross-sectional view showing an example of the configuration of a grinder used in this embodiment.

The drawings referred to in the description of the following embodiments are schematic, and the dimensional ratios of the components drawn in the drawings may differ from the actual ones.

The electrode treatment method according to this embodiment comprises a separation step of grinding, with a grinder, the electrode in which the electrode composite is held on the current collector, and separating the electrode composite from the current collector.

The electrode used in this embodiment is, for example, an electrode fabricated by applying an electrode composite containing an active material and a binder onto a current collector and compression molding the workpiece. The electrode may be an electrode waste material generated in the process of manufacturing the electrode, or may be a used electrode obtained by disassembling the battery. The electrode may be either a positive electrode or a negative electrode. Although the configuration of electrodes used in a lithium ion battery will be described below, the electrodes used in this embodiment are not limited to electrodes for the lithium ion battery.

For the positive electrode for lithium ion batteries, the following materials are used, for example.

The positive electrode active material contained in the positive electrode composite is composed of, for example, a lithium-containing composite oxide such as lithium cobalt oxide, lithium nickel oxide, or lithium manganate. In particular, since lithium cobalt oxide has excellent properties but its resources are few and expensive, its isolation and recovery has a great merit. Since lithium-containing oxide has low conductivity, a conductive agent such as acetylene black may be contained in the positive electrode composite.

The binder contained in the positive electrode composite is, for example, a fluororesin such as polytetrafluoroethylene (PTFE) or polyvinylidene fluoride (PVdF).

The positive electrode current collector is, for example, a metal foil or the like that is stable in the range of the potential of the positive electrode such as aluminum. There is a great merit in isolation and recovery of aluminum which can be used for batteries and other various electronic components.

For the negative electrode for lithium ion batteries, the following materials are used, fore example.

The negative electrode active material contained in the negative electrode composite is, for example, a carbon material such as natural graphite or artificial graphite, a metal alloying with lithium such as silicon (Si) or tin (Sn), an alloy containing a metal element such as Si or Sn, or a composite oxide.

The binder contained in the negative electrode composite is, for example, CMC, SBR, PVA, or the like in addition to the aforementioned fluororesin.

The negative electrode current collector is, for example, a metal foil or the like that is stable in the range of the potential of the negative electrode such as copper. There is a great merit in isolation and recovery of copper which can he used for batteries and other various electronic components.

A grinder according to this embodiment will now be described.

FIG. 1 is a schematic cross-sectional view showing an example of the configuration of a grinder used in this embodiment. The grinder shown in FIG. 1 comprises a grinder body 1, an upper lid 2, a first member 3, a second member 4, a spinning disk 5, a hold-down hardware 6, a spline shaft 8, a male-threaded support member 9, a lock handle 10, a clearance adjuster handle 11, a female-threaded tube 12, a meter 13, a rotatable support shaft 14, a lever 15, a supply hopper 16, and an ejection unit 17.

The first member 3 and the second member 4 each have a grinding surface. To be specific, in FIG. 1, the first member 3 has a grinding surface having a conical trapezoidal recess at the bottom. The second member 4 has a grinding surface having a conical trapezoidal recess at the top. The first member 3 and the second member 4 are positioned so that their grinding surfaces face each other and a space for grinding the electrode is defined between them.

The first member 3 is fixed to the upper lid 2. The upper lid 2 is coupled to the upper part of the grinder body 1 through the rotatable support shaft 14, and is locked into and fixed to the grinder body 1 through the lever 15. An opening is provided in the center of the upper lid 2, and the supply hopper 16 is attached in the opening.

The second member 4 rotates about the rotation axis extending in the direction in which the grinding surfaces of the first member 3 and the second member 4 face each other. In other words, the second member 4 rotates about the rotation axis extending in the direction perpendicular to the opposing grinding surfaces of the first member 3. To be specific, referring to FIG. 1, the second member 4 is placed on the spinning disk 5 fixed to the spline shaft 8 rotated by a motor, which is not shown in the drawing, and is fixed with a hold-down hardware 6. In particular, the second member 4 rotates about the spline shaft 8 as the rotation axis, integrally with the spline shaft 8.

The spline shaft 8 is integrally connected to the support member 9 in the vertical direction and rotatably coupled with it in the circumferential direction. To adjust the clearance between the first member 3 and the second member 4, the lock handle 10 is released, the clearance adjuster handle 11 is rotated, and the support member 9 coupled to the clearance adjuster handle 11 is rotated. Since the male thread formed on the outer circumference of the support member 9 is screwed with the female thread formed on the tube 12 fixed to the grinder body 1, the support member 9 moves up or down with the rotation of the clearance adjuster handle 11 and the second member 4 moves up or down accordingly, whereby the clearance is adjusted. The second member 4 is raised, the position where the grinding surfaces of the first member 3 and the second member 4 come into contact with each other is read by the meter 13, adjustment based on this position is made to obtain a desired clearance, and the clearance is then fixed by the lock handle 10.

To grind the electrode using a grinder, for example, while the second member 4 is rotated by a motor not shown in the drawing, the electrode is supplied into the supply hopper 16. Desirably, the electrode to be supplied is finely cut in advance (for example, about 4 mm$^2$ to 30 mm$^2$). The supplied electrode is supplied to the central space between the first member 3 and the second member 4. The electrode is then ground between the grinding surfaces of the first member 3 and the second member 4 while moving outward from the central portion due to the centrifugal force generated by the rotation of the second member 4. At this time, stresses such as compression, shearing, and rolling friction are applied to the electrode between the grinding surfaces of the first member 3 and the second member 4, and the electrode composite is separated from the current collector. The separated current collector and electrode composite are ejected from the gap between the grinding surfaces of the first member 3 and the second member 4 to the ejection unit 17 outer than the grinding surfaces.

Here, when the second member 4 is rotated about the rotation axis extending in the direction in which the grinding surfaces of the first member 3 and the second member 4 face each other as with the grinder used in this embodiment, the stress generated between the grinding surfaces is more likely to be applied in the plane direction than in the thickness direction of the electrode. For this reason, the electrode composite on the current collector is scraped off from the current collector and become fine particles, while the current collector is prevented from being crushed into fine particles. Note that the current collector is ejected, for example, in a curled state due to the stress generated between the grinding surfaces.

This embodiment comprises an isolation step of isolating the current collector and the electrode composite from the mixture containing the current collector and the electrode composite obtained by the grinding step. To be specific, the mixture accumulated in the ejection unit 17 of the grinder device shown in FIG. 1 is taken out, and the mixture is isolated into a current collector and an electrode composite by, for example, vibration sieving or air classification. Vibration sieving isolates the mixture by using the difference in particle size, and air classification isolates the mixture by using the difference in specific gravity. In any case, the current collector obtained in the grinding step of this embodiment has a larger particle size than the electrode composite without turning into fine particles together with the electrode composite, and is therefore barely mixed into the isolated electrode composite upon vibration sieving, air classification, or the like, making it possible to efficiently isolate the electrode composite and the current collector.

Figure 2:
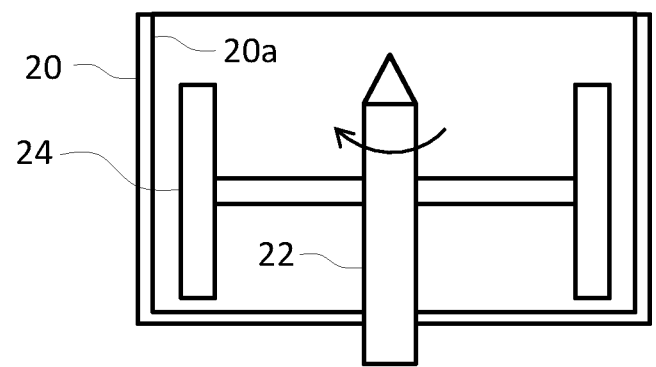
FIG. 2 is a schematic cross-sectional view of a conventional crusher.

FIG. 2 is a schematic cross-sectional view of a conventional crusher. The crusher shown in FIG. 2 comprises a bottomed tubular separation chamber 20, a rotation shaft 22 that stands at the center of the bottom of the separation chamber 20 and is rotated by driving a motor not shown in the drawing, and a blade 24 mounted so that it extends in parallel with the rotation shaft 22. The inner surface 20*a* of the separation chamber 20 has irregularities (not shown in the drawing). The blade 24 rotates about the rotation axis extending in the vertical direction to the direction opposed to the inner surface 20*a* of the separation chamber 20. In other words, the blade 24 rotates about the rotation axis extending in the direction parallel with the inner surface 20*a* of the opposed separation chamber 20.

Since a space for crushing the electrode is defined between the blade 24 and the inner surface 20*a* of the separation chamber 20, when the electrode is supplied into the separation chamber 20 and the blade 24 is rotated, the electrode hits the inner surface 20*a* of the separation chamber 20 and the blade 24 and thus is crashed and the electrode composite is separated from the current collector. However, as with the crusher in FIG. 2, when the blade 24 rotates about the rotation axis extending in the vertical direction to the direction opposed to the inner surface 20*a* of the separation chamber 20, the stress generated between the inner surface 20*a* of the separation chamber 20 and the blade 24 is more likely to be applied in the thickness direction than in the plane direction of the electrode. Hence, the electrode composite is crushed into fine particles, and the current collector is also crushed into fine particles. For this reason, when a mixture containing the current collector and the electrode composite should be isolated into the current collector and the electrode composite by vibration sieving, air classification, or the like after the electrode composite is separated from the current collector with the crusher shown in FIG. 2, the current collector is mixed into the isolated electrode composite, making it difficult to efficiently isolate the electrode composite and the current collector.

The grinder used in this embodiment will be described in more detail below.

The first member 3 and the second member 4 are obtained by, for example, casting a mixture of abrasive grains of a ceramic, such as alumina, and a binder into a mold having a predetermined shape, or applying it onto a base material, and then melting or sintering and then curing the workpiece. The abrasive grains are not limited to a ceramic, and may be, for example, a metal such as stainless steel, although a ceramic is preferred in terms of wear resistance and the like.

Although the first member 3 and the second member 4 are preferably aligned up and down in the vertical direction for efficient grinding the electrode, this is not necessarily the case and they may be aligned, for example, left and right in the horizontal direction.

The first member 3 and the second member 4 may have any shape but preferably have a disc shape in terms of rotational efficiency and the like. Further, the grinding surfaces of the first member 3 and the second member 4 preferably have an inclined portion where the gap between the grinding surfaces is narrowed from the center toward the outer circumference like the conical trapezoidal recess shown in FIG. 1, but may be composed of only a flat portion without an inclined portion. With an inclined portion where the gap between the grinding surfaces is narrowed from the center toward the outer circumference, an electrode container space is made between the opposed grinding surfaces, making it possible to wind many electrodes in a row.

The grinding surfaces of the first member 3 and the second member 4 preferably have a trench extending from the center of the grinding surface to the outer circumference. The trenches are arranged, for example, radially or spirally on the winding surfaces. With the trenches on the grinding surfaces, the electrode composite and the current collector ground between the winding surfaces of the first member 3 and the second member 4 can easily be ejected to the outside through the trenches, which facilitates recovery of the electrode composite and the current collector.

Although only the second member 4 is rotated in this embodiment, at least one of the first member 3 and the second member 4 should be rotated. In the case where both the first member 3 and the second member 4 are rotated, they may be rotated in the same direction or in opposite directions as long as they are rotated about the rotation axis extending along the direction in which the grinding surfaces face each other. The rotation speeds of the first member 3 and the second member 4 are not regulated, but are in the range of 500 to 3000 rpm, for example.

The grinder may comprise a heater that heats at least one of the first member 3 and the second member 4. When the electrode is ground while the first member 3 and the second member 4 are heated with a heater, the binder contained in the electrode composite easily evaporates, so that the particles of the electrode composite can be made finer. The grinder may comprise a device for supplying hot air (for example, 100° C. or higher) between the first member 3 and the second member 4. When the electrode is ground while hot air is supplied between the first member 3 and the second member 4 with such a device, the binder contained in the electrode composite easily evaporates, so that the particles of the electrode composite can be made finer.

EXAMPLES

The present disclosure will be further described below in Examples, but the present disclosure is not limited to Examples.

<Example 1>

The electrode was ground with the grinder shown in FIG. 1, and a separation step was carried out to separate the electrode composite from the current collector. The electrode was 200 g of waste material of a positive electrode that was produced in the manufacturing process (positive electrode active material: NCM, 180 g of positive electrode composite, 20 g of Al current collector, 200 μm of thickness, positive electrode composite/Al current collector ratio =90/10). The specifications of the grinder are as follows.

Positioning of the first and second members: the first and second members were aligned up and down in the vertical direction Size of the first and second members: six inches Trenches formed on the grinding surfaces: 3 mm deep, 5 mm wide, 50 mm long, radial shape Material for the first and second members: gray alumina Clearance between the first and second members: 500 μm Rotation speed of the second member: 1800 rpm The mixture containing a positive electrode composite and an Al current collector obtained in the separation step was subjected to vibration sieving using an 850-μm mesh, and was thus isolated into the positive electrode composite and the Al current collector. Through vibration sieving, an over-sieve material (mainly Al current collector) remaining over the sieve and an under-sieve material (mainly positive electrode composite) that has passed through the sieve and accumulated under the sieve were recovered. Afterwards, the recovered under-sieve material was dissolved with nitrate, mass spectrometry of each element was performed using an emission spectrometric analyzer (ICP-AES), the Al current collector mass and the positive electrode composite mass in the under-sieve material were determined, and the positive electrode composite recovery rate and Al mix rate were calculated by the following formulas.

Positive electrode composite recovery rate=(positive electrode composite mass in recovered under-sieve material/supplied positive electrode composite mass) ×100 Al mix rate=(Al current collector mass in recovered under-sieve material/recovered under-sieve material mass) ×100

<Example 2>

A test was conducted under the same conditions as in Example 1 except that the clearance between the first and second members was changed to 300 μm, and the positive electrode composite recovery rate and the Al mix rate were calculated.

<Example 3>

A test was conducted under the same conditions as in Example 1 except that the first and second members without trenches were used, and the positive electrode composite recovery rate and the Al mix rate were calculated.

<Example 4>

A test was conducted under the same conditions as in Example 1 except that the electrode was 200 g of negative electrode waste material (170 g of negative electrode composite and 30 g of Cu current collector) that was produced in the manufacturing process. Afterwards, the recovered under-sieve material was dissolved with nitrate, mass spectrometry of each element was performed using an emission spectrometric analyzer (ICP-AES), the Cu current collector mass and the negative electrode composite mass in the under-sieve material were determined, and the negative electrode composite recovery rate and Cu mix rate were calculated by the following formulas.

Negative electrode composite recovery rate=(negative electrode composite mass in recovered under-sieve material supplied negative electrode composite mass) ×100 Cu mix rate=(Cu current collector mass in recovered under-sieve material/recovered under-sieve material mass) ×100

<Comparison Example>

A. test was conducted under the same conditions as in Example 1 except that the crusher shown in FIG. 2 was used instead of the grinder shown in FIG. 1 and the electrode was crushed into the same grain size as in Example 1, and the positive electrode composite recovery rate and the Al mix rate were calculated.

Table 1 summarizes the results of the (positive electrode composite or negative electrode composite) recovery rate and (Al or Cu) mix rate of Examples and Comparative Example.

TABLE 1

|  | Recovery rate | Mix rate |
| --- | --- | --- |
| Example 1 | 81% | 0.5% |
| Example 2 | 92% | 1.2% |
| Example 3 | 75% | 0.2% |
| Example 4 | 95% | 0.3% |
| Comparative Example | 81% | 7.2% |

In Examples 1 to 4, the (Al or Cu) mix rate was lower than that of Comparative Example. Therefore, efficient isolation of the electrode composite and current collector is more achievable when the electrode is ground with, rather than a conventional crusher, the grinder that was used in Examples, that is, a grinder that includes a first member having a grinding surface and a second member having a grinding surface, and the first member and the second member are positioned so that the grinding surfaces of the first member and the second member face each other and a space for grinding the electrode is defined between the grinding surfaces, and at least one of the first member and the second member rotates about a rotation axis extending in a direction in which the grinding surfaces face each other.

REFERENCE SIGNS LIST

1 Grinder body
2 Upper lid
3 First member
4 Second member
5 Spinning disk
6 Hold-down hardware
8 Spline shaft
9 Support member
10 Lock handle
11 Clearance adjuster handle
12 Tube
13 Meter
14 Support shaft
15 Lever
16 Supply hopper
17 Ejection unit
20 Separation chamber
22 Rotation shaft
24 Blade

The invention claimed is:

1. An electrode treatment method, comprising:
a separation step of grinding with grinder means, an electrode in which an electrode composite is held on a current collector wherein the electrode composite is separated from the current collector by said grinding while the current collector is prevented from being crushed during said separation step,
wherein the grinder means include a grinder that includes a first member having a grinding surface and a second member having a grinding surface,
the first member and the second member are positioned so that the grinding surfaces of the first member and the second member are opposite each other in an alignment direction in which the first member and the second member are aligned, so as to define a space for grinding the electrode between the grinding surfaces,
at least one of the first member and the second member rotates about a rotation axis extending parallel to the alignment direction, and
the grinding surfaces of the first member and the second member have a trench extending outward from the center of each grinding surface, wherein the trench is arranged spirally on the grinding surface.

2. The electrode treatment method according to claim 1, comprising: an isolation step of isolating the electrode composite and the current collector from a mixture containing the electrode composite and the current collector obtained in the separation step.

3. The electrode treatment method according to claim 1, wherein the alignment direction is vertical.

4. The electrode treatment method according to claim 1, wherein the first member and the second member have a disk shape, and the grinding surface of the first member and the grinding surface of the second member have an inclined portion that is inclined such that a gap between the grinding surfaces is narrowed from the center of each grinding surface toward the outer circumference.

5. An electrode treatment method, comprising:
a separation step of grinding with grinder means, an electrode in which an electrode composite is held on a current collector wherein the electrode composite is separated from the current collector by said grinding while the current collector is prevented from being crushed during said separation step, wherein the grinder means include a grinder that includes a first member having a grinding surface and a second member having a grinding surface, the first member and the second member are positioned so that the grinding surfaces of the first member and the second member are opposite each other in an alignment direction in which the first member and the second member are aligned, so as to define a space for grinding the electrode between the grinding surfaces, at least one of the first member and the second member rotates about a rotation axis extending parallel to the alignment direction, and the grinding surfaces of the first member and the second member have a trench extending outward from the center of each grinding surface, wherein the trench is arranged radially on the grinding surface, and has a constant depth and width throughout a radial shape thereof.

6. The electrode treatment method according to claim 5, comprising: an isolation step of isolating the electrode composite and the current collector from a mixture containing the electrode composite and the current collector obtained in the separation step.

7. The electrode treatment method according to claim 5, wherein the alignment direction is vertical.

8. The electrode treatment method according to claim 5, wherein the first member and the second member have a disk shape, and the grinding surface of the first member and the grinding surface of the second member have an inclined portion that is inclined such that a gap between the grinding surfaces is narrowed from the center of each grinding surface toward the outer circumference.

* * * * *